(12) United States Patent
Brown et al.

(10) Patent No.: US 7,190,264 B2
(45) Date of Patent: Mar. 13, 2007

(54) WIRELESS COMPUTER MONITORING DEVICE WITH AUTOMATIC ARMING AND DISARMING

(75) Inventors: Matthew Brown, Vancouver (CA); Hani Mehrpouyan, Port Moody (CA); Christopher Mitchell, North Vancouver (CA)

(73) Assignee: Simon Fraser University, Burnaby (CA)

( * ) Notice: Subject to any disclaimer, the term of this patent is extended or adjusted under 35 U.S.C. 154(b) by 184 days.

(21) Appl. No.: 11/072,332

(22) Filed: Mar. 7, 2005

(65) Prior Publication Data

US 2005/0237185 A1    Oct. 27, 2005

Related U.S. Application Data

(60) Provisional application No. 60/549,921, filed on Mar. 5, 2004.

(51) Int. Cl.
*G08B 1/08* (2006.01)

(52) U.S. Cl. ............................ 340/539.23; 340/539.21; 340/571; 340/568.1; 340/568.8; 340/687; 340/542; 713/182; 713/185; 713/200; 713/201

(58) Field of Classification Search ........... 340/539.21, 340/539.23, 571, 568.1, 568.8, 687, 542; 713/182, 185, 200, 201
See application file for complete search history.

(56) References Cited

U.S. PATENT DOCUMENTS

| | | | |
|---|---|---|---|
| 5,578,991 A | 11/1996 | Scholder | |
| 5,757,271 A | 5/1998 | Andrews | |
| 5,963,131 A | 10/1999 | D'Angelo et al. | |
| 6,011,471 A * | 1/2000 | Huang | 340/568.1 |
| 6,133,830 A | 10/2000 | D'Angelo et al. | |
| 6,189,105 B1 * | 2/2001 | Lopes | 726/20 |
| 6,570,610 B1 | 5/2003 | Kipust | |
| 7,009,512 B2 * | 3/2006 | Cordoba | 340/539.23 |
| 7,107,455 B1 * | 9/2006 | Merkin | 713/182 |

* cited by examiner

*Primary Examiner*—Tai Nguyen
(74) *Attorney, Agent, or Firm*—Oyen Wiggs Green & Mutala LLP (57) ABSTRACT

A monitoring system for a valuable item, such as a digital device, has a base unit affixed to the valuable and a remote unit carried by a person responsible for the valuable. Signals are exchanged between the base and remote units. The base continuously monitors for signals from the remote unit and can arm or disarm automatically in response to such signals. When armed, the base communicates with a program running on the valuable to lock peripherals. The base alerts the owner upon movement of the valuable, allowing the owner to screen for false alarms or be notified of an occurring theft attempt. A digital connection between the base and the valuable may be used to encrypt any data stored on the valuable and charge the internal batteries of the security device. A soft switch enables the base to be powered off by the corresponding remote unit.

33 Claims, 7 Drawing Sheets

WIRELESS COMPUTER MONITORING DEVICE WITH AUTOMATIC ARMING AND DISARMING

REFERENCE TO RELATED APPLICATION

This application claims priority from prior pending U.S. application No. 60/549,921, filed on 5 Mar. 2004, which is incorporated herein by reference.

TECHNICAL FIELD

The present invention is directed to a system and method for detecting when a digital device, such as a personal computer, is being separated from a person. If separation is detected, the person is notified and without further action required, the device is automatically disabled.

BACKGROUND

The theft or loss of a digital device (valuable) continues to pose a problem, especially for people who are traveling. Going to the washroom, taking an hour away from the office for lunch, traveling by car or airplane, frequenting hotels, are just some of the common tasks people undertake as part of their normal schedules. Items such as cellular telephones, personal digital assistants (PDA), digital cameras, LCD projectors, laptop computers, and desktop computers are just some of the small, but valuable, items that thieves target.

Laptop computers are especially tempting targets for thieves because they are both valuable and portable. More and more laptop computers are being used each year. Millions of laptop computers are in use worldwide and laptop computer sales have been continuously increasing due to lower prices and the availability of wireless networks which make it possible to work almost anywhere. More and more portable computing devices are being introduced to the market.

Correspondingly, the rates of theft of portable computing devices have been increasing year by year. The theft of portable; devices is a major issue that has yet to be appropriately addressed by laptop computer manufacturers or security device companies. A large percentage of total thefts occur in public places on the road and in airports. A smaller but significant percentage of thefts take place from offices.

Current anti-theft solutions and theft-deterrent systems range from simple, passive methods to more complex separation detectors, two-way signaling devices, and motion alarms. Some of the separation detectors have useful features. The notion of a system knowing where the user is in relation to his/her valuable is an important step forward. However, these devices are passive, and situations will often occur where a user is separated from a valuable yet a theft is not occurring (e.g. while the person is visiting a washroom).

Two-way signaling devices extend the capability of monitoring a valuable further by allowing a user to screen signals and get feedback from the valuable. However, these methods are often complex and require too much interaction from the user.

There exists a need for practical theft-deterrent systems. Such systems should ideally: be simple to use, allow users to be mobile; require no interaction when a user is relatively close to the valuable; be at least nearly free from false alarms; not require the user to remember to arm and disarm the system; and protect any proprietary information housed within the valuable.

SUMMARY OF THE INVENTION

Apparatus according to certain preferred embodiments of the invention can detect the proximity of the owner/guardian to a valuable, arm and disarm automatically, protect proprietary information housed within the valuable, and notify a responsible person of any theft attempts that occur when they are not in the immediate vicinity of the valuable.

One aspect of the invention provides a security apparatus for protecting a valuable. The security apparatus comprises a portable remote unit and a base unit configured for coupling to the valuable. The remote unit comprises a first transceiver capable of transmitting and receiving data signals, a notification device coupled to said first transceiver, the notification device being capable of activation in response to an alert signal received by said first transceiver, and, a deactivation element coupled to said first transceiver, the deactivation element configured to cause said first transceiver to transmit a DISARM signal representative of a command to deactivate an alarm. The base unit comprises a second transceiver capable of transmitting and receiving data signals, a proximity determining mechanism configured to detect a proximity of the remote unit to the base unit, and, a data connection to the valuable, said base unit configured to send a signal to the valuable by way of the data connection, the signal indicating that the valuable should be disabled when the proximity determining mechanism determines that the remote unit is not within a predetermined proximity of the base unit.

Another aspect of the invention provides a base unit for use in securing a valuable article. The base unit comprises a wireless transceiver capable of transmitting and receiving data signals, a proximity determining mechanism configured to detect a proximity of a remote unit to the base unit, and, a data connection to the valuable article. The base unit is configured to send a signal to the valuable by way of the data connection, the signal indicating that the valuable should be disabled when the proximity determining mechanism determines that the remote unit is not within a predetermined proximity of the base unit. The configuration may comprise the provision of a programmed controller or hard wired control mechanism in the base unit, for example.

A further aspect of the invention provides a method for securing a valuable. The method comprises coupling a base unit to the valuable; detecting whether a remote unit is within a predetermined range of the base unit; if the remote unit is not within the predetermined range of the base unit, executing a locking process comprising: sending a lock signal to lock the valuable; and, if the remote unit is within the predetermined range of the base unit, executing an unlocking process comprising: sending an unlock signal to unlock the valuable.

Various additional aspects of the invention and features of embodiments of the invention are described below.

BRIEF DESCRIPTION OF THE DRAWINGS

In drawings which illustrate non-limiting embodiments of the invention:

FIG. 4 shows a base unit according to one embodiment of the invention comprising a locking means to attach the base unit to a device such as a laptop computer, projector, or the like;

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
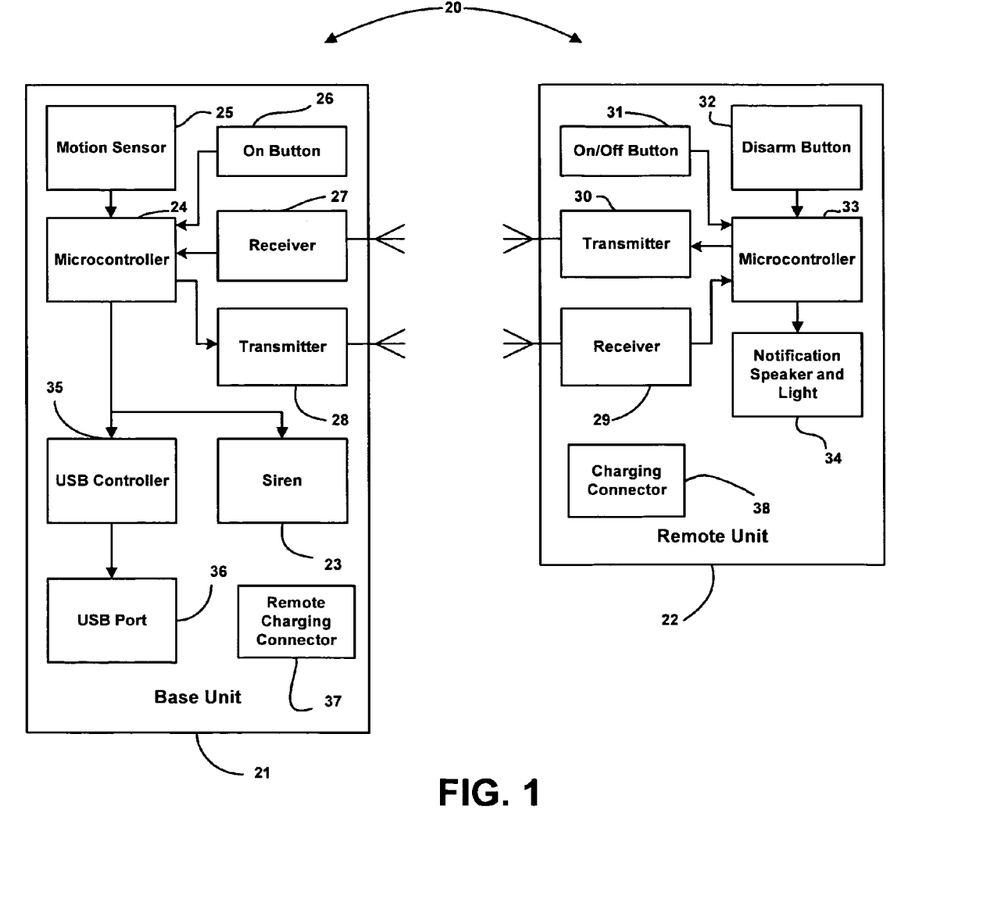
FIG. 1 is a schematic diagram illustrating connectivity between a base unit and a remote unit in a system according to the invention.

FIG. 1 shows a system 20 for monitoring and protecting a valuable item, such as a laptop computer, projector, or the like. System 19 comprises a pair of units, a base unit 21 and a corresponding remote unit 22. Base unit 21 is attached to a valuable in some manner. The corresponding remote unit 22 is carried by a person, such as the owner, user or guardian of the valuable.

Base unit 21 comprises a control system which, in the illustrated embodiment, comprises a programmed microcontroller 24. Remote unit 22 comprises a control system which, in the illustrated embodiment comprises a programmed microcontroller 33. Microcontrollers 24 and 33 may comprise commercially available chipsets or be formed by discrete components. For example, a microcontroller may comprise a CPU, timer, random access memory (RAM), read-only memory (ROM), address logic, and a direct memory controller (DMA). Operating programs for microcontrollers 24 and 33 may be stored in microcontrollers 24 and 33 or in separate memories accessible to microcontrollers 24 and 33. The components described herein are merely representative of components that can be applied in embodiments of the invention. In alternative embodiments, suitable hardware logic circuits may be provided to perform the functions of microcontrollers 24 and 33.

Base unit 21 includes microcontroller 24, a motion sensor system 25, a siren circuit 23, an "ON" user control 26, a USB controller 35, a USB port 36, and a remote charging connector 37.

Base unit 21 also includes a wireless data communication mechanism for communicating with remote unit 22. In the illustrated embodiment, communication with remote unit 22 is provided by a radio frequency (RF) transceiver that may comprise a transmitter 28 and a receiver 27. The RF transceiver 27 and 28, can be a commercially available RF transceiver that is capable of transmitting and receiving radio frequency signals or may be made up of discrete components. Other suitable RF or other wireless signaling devices could be provided in place of RF transceiver 27 and 28.

Motion sensor circuit 25, can include one or more of:
one or more tilt switches capable of detecting rotational changes;
a vibration sensor which detects vibrations;
one or more accelerometers;
one or more light detector circuits;
one or more pressure sensors;
or the like.

Motion sensor circuit 25 comprises circuitry that communicates to microcontroller 25 when motion has been detected. For example, the circuitry may set a flag in a data register accessible to microcontroller 24 or trigger an interrupt sequence in microcontroller 24 or send a message to microcontroller 24 or the like.

Siren circuit 23, may include a commercially-available speaker or other sound-emitting device and circuit which drives the device to produce sound.

ON control 26 may comprise a standard button or any other suitable input mechanism which enables a user to cause base unit 21 to turn on.

System 20 provides a channel for communication between base unit 21 and a valuable being protected. In the illustrated embodiment, this communication channel is provided by way of a USB (universal serial bus) connection including a USB controller 35 and a USB port 36. USB controller 35 may comprise a commercially-available chipset that implements a USB protocol. USB port 36 could comprise a USB physical connector, for example. It can be appreciated that communication between base unit 21 and a valuable being protected may be provided by any suitable circuit or other mechanism that establishes a data connection between base unit 21 and a process 100 running on board the valuable. For example, a suitable serial port connector, a direct connection with internal circuitry of the valuable, a proprietary connector, a PCI bus, PC card interface, or the like could be provided in place of USB controller 35 and USB port 36.

Remote charging connector 37 may comprise a commercially available connector or a docking station.

Base unit 21 comprises a mechanism that permits it to be securely connected to a valuable being protected. For example, base unit 21 may comprise a fitting that can be lockably engaged to a Kensington™ security slot, which may be found on laptops, LCD monitors, LCD projectors and the like. The mechanism may comprise a flexible tether such as a cable or the like between base unit 21 and the valuable. In some alternative embodiments:

base unit 21 is affixed to the valuable, for example with a suitable adhesive, screws or other fasteners or the like; or, base unit 21 includes a mechanism that can be detachably locked to a fitting attached to the valuable by way of a suitable adhesive, screws or other fasteners or the like;

base unit 21 comprises a mechanism to lock base unit 21 to some other feature of the valuable.

Remote unit 22 includes a microcontroller 33, a notification circuit 34, an ON/OFF user control 31, a DISARM user control 32, and a charging connector 38. Remote unit 22 also comprises a wireless data communication mechanism compatible with that of base unit 21. In the illustrated embodiment, remote unit 22 comprises an RF transceiver composed of a transmitter 30 and a receiver 29. RF transceiver 29 and 30 can be a commercially available RF transceiver that is capable of exchanging radio frequency signals with RF transceiver 27, 28 of base unit 21. Other suitable RF or other wireless signaling devices could be provided in place of RF transceiver 29, 30.

RF transceiver 27 and 28 of base unit 21, and RF transceiver 29 and 30 of remote unit 22 may be configured to operate at variable operating frequencies or using a wide spectrum to prevent interference from other products working at similar frequencies. Suitable frequency-shifting technologies are known to those skilled in the art of wireless data communications.

Notification circuit 34, may comprise a speaker, a vibrator, a sound emitting device, and/or a light emitting device together with any circuitry required to drive such device to alert a user.

ON/OFF user control 31, may comprise a standard button or other suitable input mechanism which a user can use to send a signal to another part of the circuitry of remote unit 22.

DISARM user control 32, can be a standard button or other suitable input mechanism which a user can use to send a signal to another part of the circuitry of remote unit 22. In one embodiment, activation of DISARM user control 32 causes a flag to be set in the microcontroller 33.

In the embodiment depicted above, programs running on the microcontroller 24 of the base unit 21 and the microcontroller 33 on the remote unit 22 control base unit 21 and remote unit 22 to periodically signal each other. These signals permit base unit 21 and remote unit 22 to detect the proximity to one another and send alerts to one another indicating events such as:

movement of base unit 21, remote unit 22 being separated from base unit 21 by some distance, the activation of DISARM user control 32 on the remote unit 22 by an owner or user.

During normal operation, both remote unit 22 and base unit 21 expect to periodically receive a coded signal from one another every so often.

The signals exchanged between remote unit 22 and base unit 21 may be encoded. Each system 20 may encode signals in a different unique manner such that two or more similar systems 20 can operate in the same vicinity and frequency without interfering with one another. Each base unit 21 and remote unit 22 may be configured to ignore signals unless the signals are encoded in a way corresponding to the matching remote unit 22 or base unit 21. Encoding may be performed by microcontrollers 24 and 33 using any suitable encoding method or methods. The encoding for signals going from base unit 21 to remote unit 22 could be but is not necessarily the same as the encoding for signals traveling from remote unit 22 to base unit 21.

In some embodiments, the remote unit includes a system identifier for generating a system identification signal representative of the remote unit and at least one base unit. In some cases the remote unit may comprise a unit identifier for generating unit identifier codes capable of discriminating among a plurality of base units having a common system identification signal. In such embodiments, a single remote unit 22 could be used in conjunction with a plurality of base units 21 each protecting a different valuable.

Figure 2:
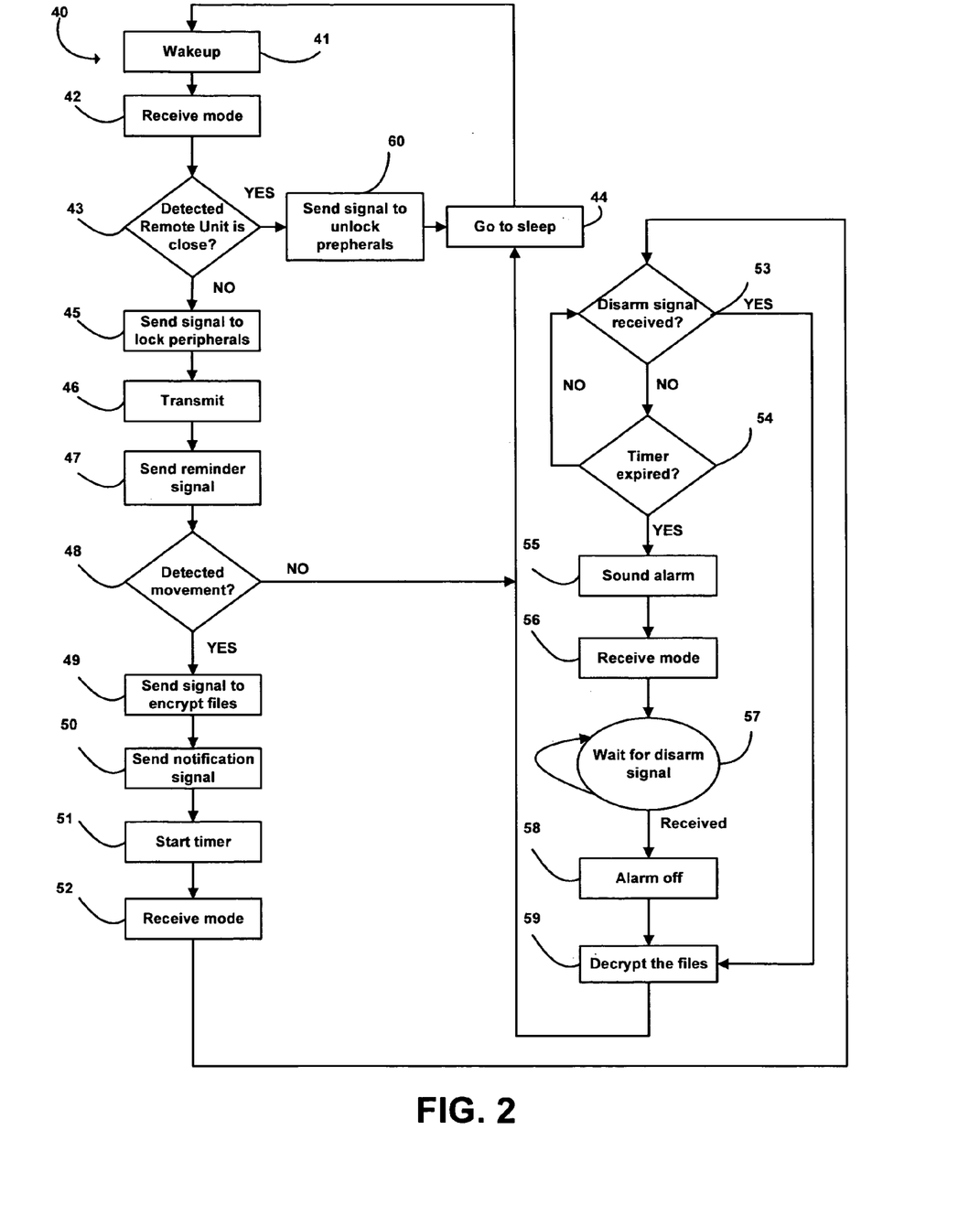
FIG. 2 is a flowchart illustrating a method performed at the base unit during operation of the system of FIG. 1.

FIG. 2 is a flowchart for a possible control process 40 for a base unit 21. Process 40 may be effected by software executed on microcontroller 24. Process 40 commences at block 41 where microcontroller 24 is either powered up or woken up from a low-power idle mode. Technology for conserving power by placing a processor in a low-power idle mode and periodically waking up the processor is common and can be implemented in any suitable manner. For example, a software timer or a hardware timer may be provided to periodically interrupt microcontroller 24.

A hardware timer may comprise, for example a suitable digital logic counter coupled to a system clock which passes a signal of elapsed time to another part of the circuit. A CPU may set the timer to expire after a certain period of time and then set a flag or data register or send a signal to some circuitry indicating that time has expired.

Process 40 places microcontroller 24 and transceiver 27 and 28 in a "sleep" or low-power mode where minimal processing can be done, but much power is saved. By operating the circuits at full power only some of the time, power is conserved with the capability of greatly reducing the overall power consumption. In some cases, power can be on less than half of the time, and in another cases it can be on for only a quarter of the time, and in yet other cases power can be on for less than an eighth of the time, and so on.

Once microcontroller 24 is activated, process 40 proceeds to block 42 where receiver 27 is set to receive mode for a short period of time. While receiver 27 is in receive mode, microcontroller 24 checks to see if a valid signal from the corresponding remote unit 22 is received.

Process 40 then proceeds to block 43 wherein it controls transmitter 28 to transmit an RF signal at low power. The signal includes preamble bits of data. Other receivers can lock onto the frequency of transmission of transmitter 28 while the preamble is being transmitted. Transmitter 28 then transmits a unique identifier of bits known only to the corresponding remote unit 22, followed by instruction bits which the remote unit 22 can process. The power of transmission on the transmitter 28 determines how strong the radio signal will be when it is received at the corresponding remote unit 22. An increase in power provides a greater range.

If a proper low-power signal is received from remote unit 22, process 40 provides a signal to the program 100 running on the valuable by way of USB port 36. In response to receiving the signal from base unit 21, program 100 keeps peripherals associated with the valuable unlocked 60 and proceeds to sleep 44. However, if process 40 does not receive the low power signal from the corresponding remote unit 22, this indicates that the remote unit 22 is outside of the immediate proximity of the base unit 21 and the process 40 proceeds to step 45.

In the foregoing description, block 43 determines whether or not remote unit 22 is nearby to base unit 21 by sending a low power signal and waiting for a reply from remote unit 22. If no reply arrives, then it is assumed that the corresponding remote unit 22 did not receive the low power signal and is outside of a given radial proximity. An alternative method that may be used to determine the proximity of remote unit 22 to base unit 21, or vice versa, is to send a signal of greater power and to measure the strength of the signal received. If the strength of the received signal falls below a predetermined threshold then the unit can be deemed to be outside of a given radial proximity. Yet another method of determining the proximity of remote unit 22 to base unit 21 is to transmit ultrasonic waves from base unit 21 or remote unit 22 and to detect the ultrasonic waves at the corresponding remote unit 22 or base unit 21.

Block 45 involves sending a signal through the USB controller 35 to the program 100 on board the valuable. On receipt of the signal, program 100 causes peripherals of the valuable to be locked. Process 40 proceeds to step 46 where a reminder signal is sent from the transmitter 28 of base unit 21. The reminder signal causes remote unit 22 to indicate to a user that base unit 21 and the valuable attached to it have been left behind. This feature enables a user to be notified with a subtle beep or visual queue if he or she becomes separated from the valuable.

Process 40 moves onto step 48 where microcontroller 24 is in an armed state in which it monitors motion sensor circuit 25 for a signal indicating that the valuable has been moved or interfered with. If no motion is detected, process 40 goes back to sleep at 44. However, if motion is detected, a signal is sent (block 49) from the base unit 21 through USB controller 35 to program 100 on board the valuable. The signal causes program 100 to start encrypting data stored within the valuable.

Following block 49 a notification signal is immediately sent (block 50) from transmitter 28 indicating such a movement. In block 51 a timer is started. The timer sets a period during which it is possible for the owner to disarm base unit 21, and thereby avoid sounding a siren or other alarm. During the period while the timer is counting, process 40 enters receive mode 52 and waits for a DISARM signal to arrive from remote unit 22. If a DISARM signal is received as indicated at block 53 before the timer expires then process 40 proceeds to decrypt (block 59) the data on board the valuable and proceeds to sleep 44 once more. However, if the timer expires (block 54) before a DISARM signal is received from the corresponding remote unit 22, process 40 proceeds to initiate the siren at block 55.

After the siren has been initiated in block 55, receiver 27 enters receive mode 56 and continues to wait to receive a DISARM signal (block 57) from the corresponding remote unit 22. Not until this signal is received does the base unit 21 turn the siren off (block 58) or decrypt the data on the valuable (block 59). Block 59 may comprise sending a signal through USB controller 35 to program 100 running on board the valuable. The signal causes program 100 to decrypt the data on board the valuable. After executing blocks 58 and 59, microcontroller 24 and transceiver (27 and 28) enter sleep mode (block 44) once again.

Figure 3:
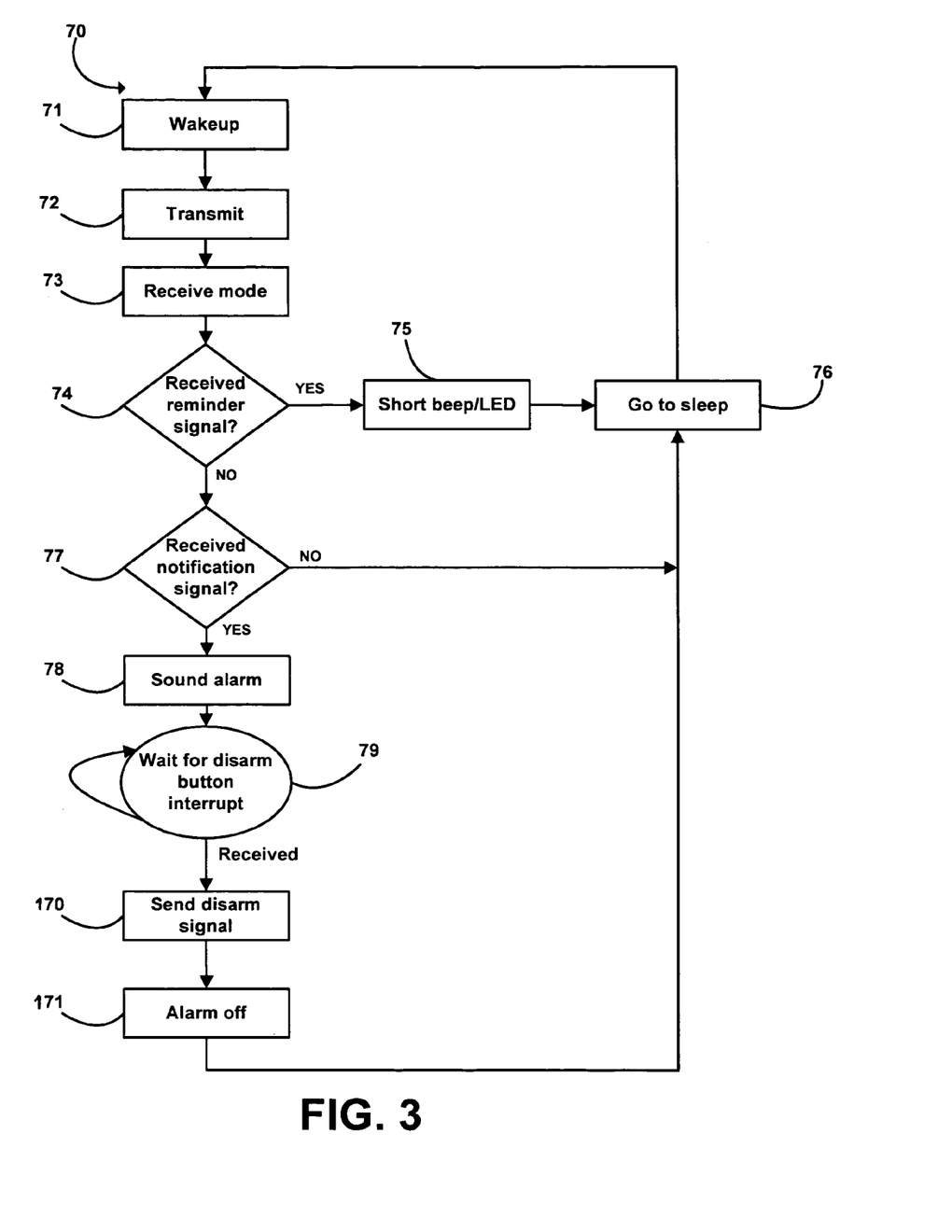
FIG. 3 is a flowchart of a method performed at the remote unit during operation of the system of FIG. 1.

FIG. 3 is the flowchart for an example control process 70 that may be performed on remote unit 22. Process 40 described above assumes the coexistence of a complementary process 70 being executed at remote unit 22. Process 70 commences at block 71 where microcontroller 33 is either powered up or woken up from a low power idle mode. Microcontroller 33 of remote unit 22 may be configured to conserve power in a similar manner to microcontroller 24 as described above. The wakeup process on the remote unit 22 is similar to that of base unit 21.

Process 70 then proceeds to step 72 wherein it controls transmitter 30 to transmit an RF signal at low power and then proceeds immediately to receive mode at block 73. If, during this receive mode, microcontroller 33 detects a reminder signal 74 from base unit 21 then microcontroller 33 causes the notification circuit 34 to issue a short indicator (block 75). The indicator comprises an audible, visual or tactile signal that lets the person carrying remote unit 22 know that they have become separated from base unit 21 and the attached valuable. After issuing the short indicator, process 70 goes to sleep at block 76.

Remote unit 22 receives a notification signal from base unit 21 indicating that a movement occurred (block 77) then process 70 moves forward to block 78 where notification circuit 34 is turned fully on. After activating notification circuit 34, process 70 checks at block 79 to see whether the DISARM user control 32 has been activated. If DISARM user control 32 has been activated then process 70 causes a DISARM signal to be sent to the associated base unit 21 (block 170) and turns off notification circuit 34 (block 171). Process 70 remains at block 79 until the user DISARM control 32 is activated and only then proceeds to sleep at block 76.

Figure 4:
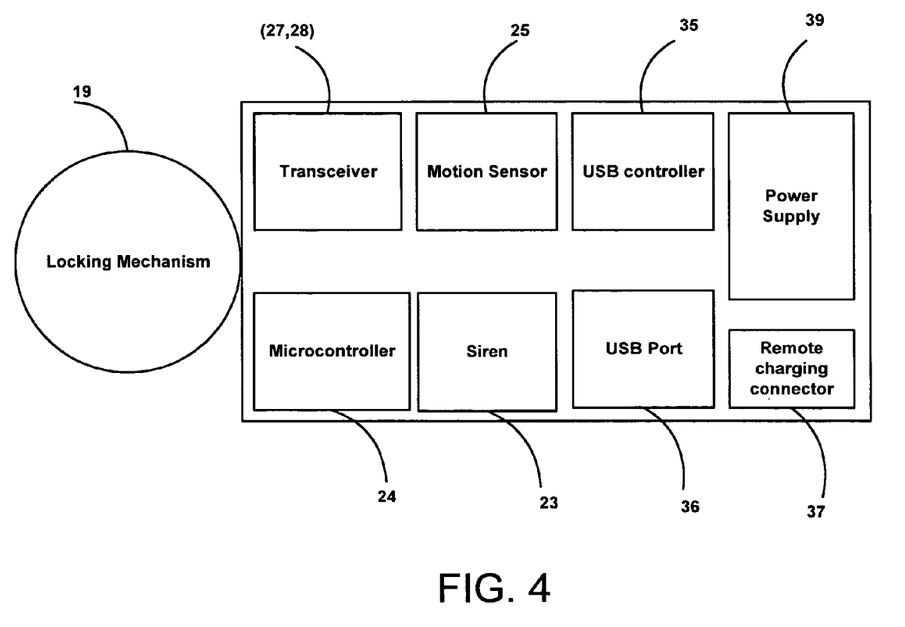

FIG. 4 depicts a base unit 21 having a locking mechanism that permits it to be physically attached to a valuable device like a laptop computer, liquid crystal display (LCD) monitor, a projector or the like. Locking mechanism 19 may, for example, attach to the security slot of laptops, LCDs, and LCD projectors.

Figure 5:
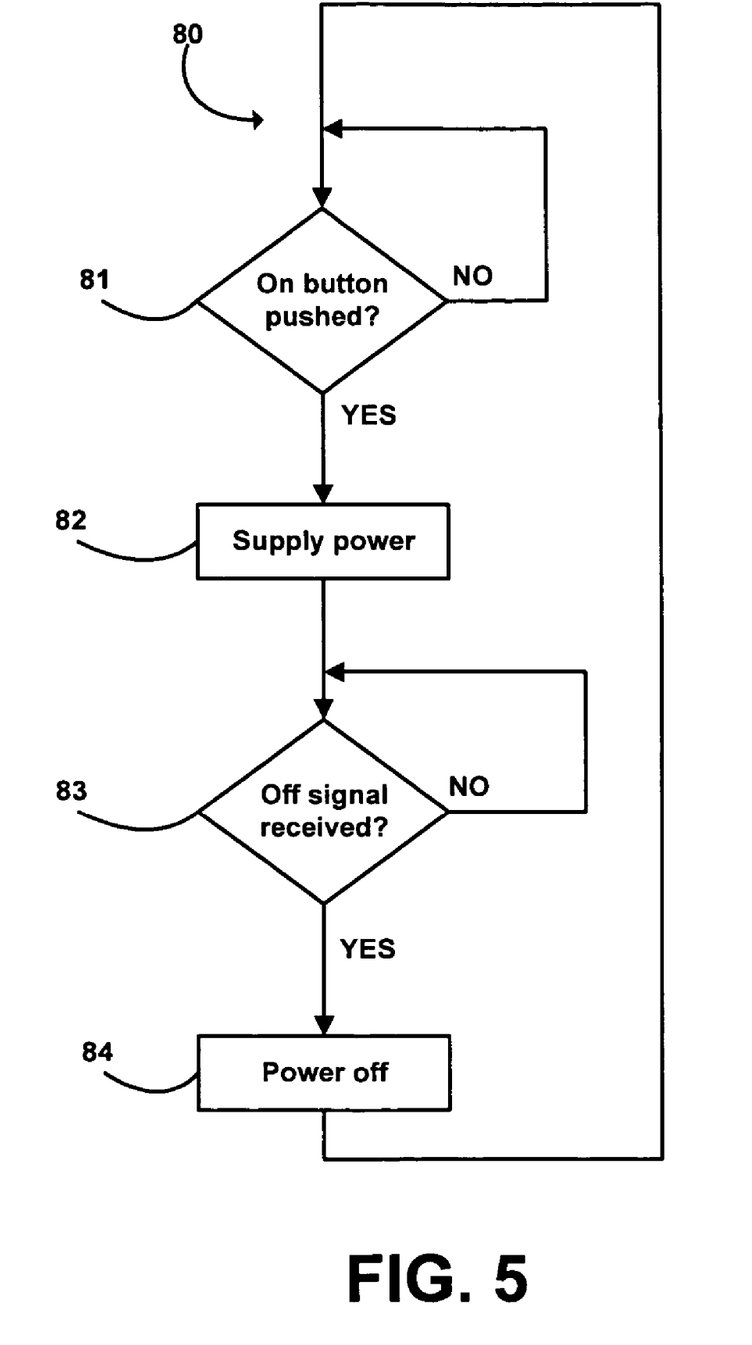
FIG. 5 is a flowchart showing a method for operating a tamper resistant power switch in a base unit.

FIG. 5 is a flowchart of a process 80 that provides a soft switch mechanism for controlling power to remote unit 22 and base unit 21. The term "soft switch" indicates that the switch uses software and hardware circuitry to accomplish its task. The system described herein enables only the person carrying remote unit 22 to turn power off on the corresponding base unit 21. Starting with the logic behind the base unit 21, activating the ON user control 26 moves the process 80 from block 81 to block 82 where power is supplied to the microcontroller 24 and the circuit of the base unit 21. After this, activating the ON user control 26 additional times has no effect. Process 80 then waits (block 83) to receive an OFF signal from the corresponding remote unit 22. Upon receiving the OFF signal, process 80 turns off the power (block 84) on base unit 21.

Figure 6:
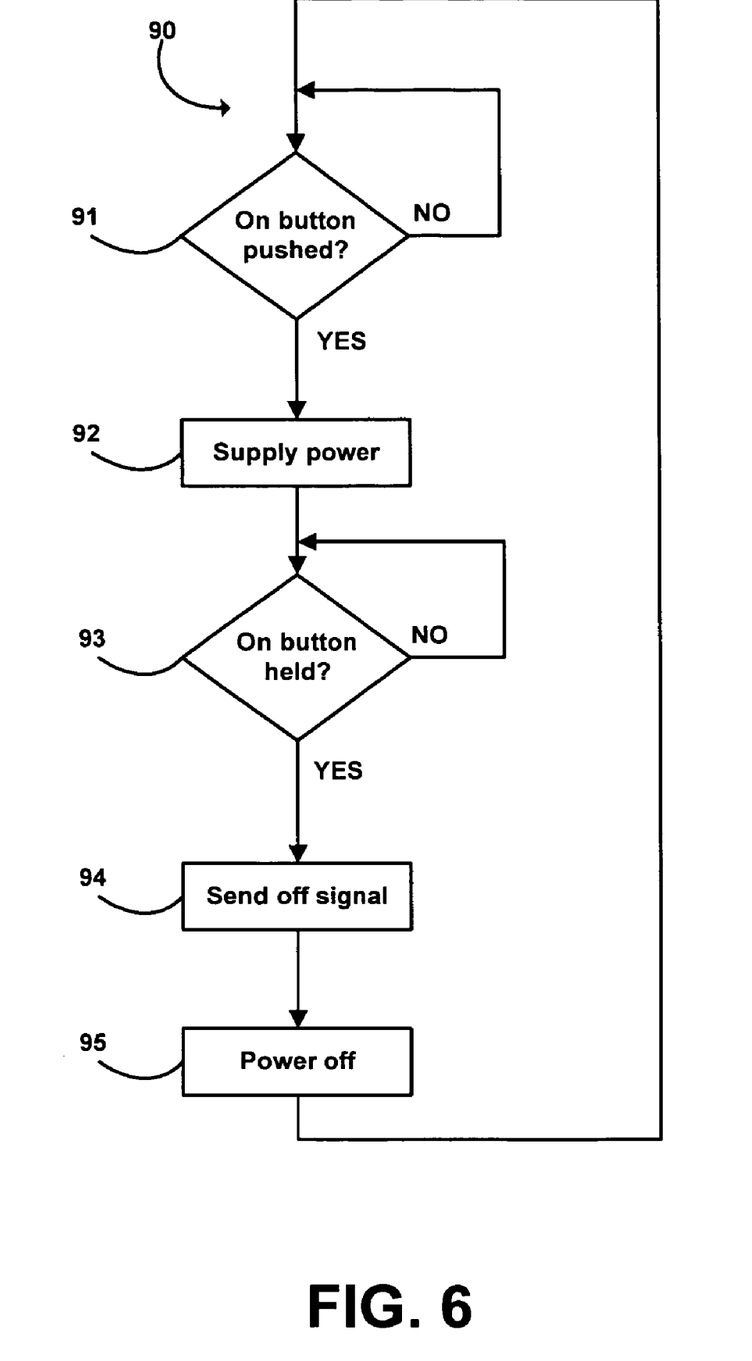
FIG. 6 is a flowchart illustrating a method for operating an ON/OFF power system at a remote unit; and, FIG. 7 is a flowchart illustrating a method performed on the apparatus being protected by the system of FIG. 1.

FIG. 6 is a flowchart of a process 90 for switching on remote unit 22. When ON/OFF user control 31 is initially activated in block 91, power is supplied (block 92) to microcontroller 33 and the other circuitry of remote unit 22. Process 90 then moves to block 93 where it waits for the ON/OFF user control to be held high, rather than just instantaneously changed. Microcontroller 33 checks the status of ON/OFF user control 31 often and distinguishes between the ON command and OFF command originating from the same user control 31. The ON command requires only a single, instantaneous activation of ON/OFF user control 31, while the OFF command requires a prolonged activation. The time to be held can be adjusted. The intention is to make it unlikely that a person carrying remote unit 22 could accidentally turn off both remote unit 22 and base unit 21 by activating ON/OFF user control 31.

When microcontroller 33 detects that ON/OFF user control 31 has been pressed and held for the required time then process 90 proceeds to block 94 where it sends an OFF signal from the transmitter 30, to the corresponding base unit 21. Process 90 then completes at block 95 by turning the power off to the circuitry of remote unit 22.

Figure 7:
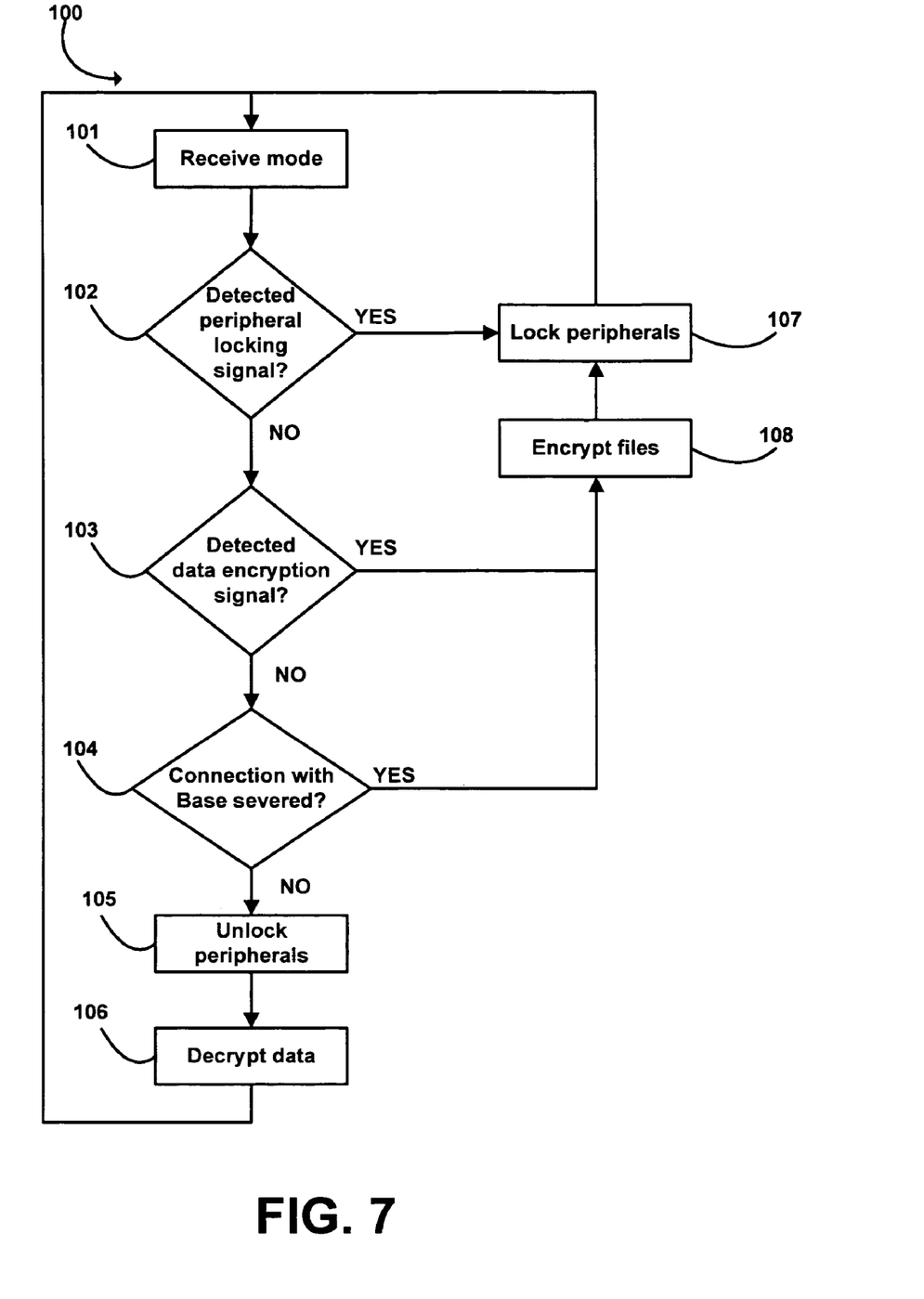

As described above, where the valuable being protected comprises a data processor then base unit 21 may interact with a program 100 executing on the valuable. This may occur, for example, where the valuable comprises a laptop computer. FIG. 7 is flowchart that illustrates an example process that may be implemented by a program 100 on the digital valuable. Program 100 communicates with USB controller 35 of base unit 21 which ultimately communicates with microcontroller 24.

Initially program 100 is in receive mode 101 to detect any messages sent by base unit 21. If program 100 receives a signal indicating that peripherals should be locked (block 102), program 100 prompts the operating system of the valuable or unilaterally locks the peripherals of the valuable (block 107). For example, block 107 may involve, among other things, disabling a display, keyboard and pointing device of a computer. Locking the peripherals prevents access to the valuable.

Process 100 remains in receive mode in block 101. If program 100 receives a further signal from base unit 21 indicating that data should be encrypted (block 103) then program 100 commences to encrypt the data on board the valuable at block 108. Program 100 may perform encryption by invoking encryption functions of an operating system of the valuable, invoking encryption software or hardware or by acting unilaterally.

If the connection between the program 100 and the base unit 21 is severed as detected at block 104 then program 100 locks the peripherals of the valuable at block 107 and encrypts the data on board the valuable at block 108. Encryption may be performed as described above. If program 100 determines at block 104 that it is still connected to base unit 21 and program 100 does not receive the peripheral locking signal at block 102 or the data encryption signal at block 103 then process 100 will keep peripherals of the valuable unlocked (block 105) and keep the data decrypted (block 106).

If program 100 receives signals from base unit 21 to unlock the peripherals of the valuable and/or decrypt data then program 100 unlocks the peripherals at block 105 and decrypts the data at block 106.

Each of base unit 21 and remote unit 22 may be powered by internal batteries. The batteries may be rechargeable. System 20 optionally has features for handling a situation wherein batteries in the remote unit or base unit get low. For example, the remote unit may be configured to detecting whether its internal batteries have reached a predetermined low-power threshold. If so, the remote unit may transmit a low-power signal to the base unit. This may cause the remote unit and base unit to switch to a reduced power consumption mode wherein communications between the remote unit and base unit are reduced or performed at lower power levels. Receipt by the base unit of a low-power signal may cause the modification of parameters within the proximity determining mechanism. For example, weak or absent signals from a low power remote unit may not necessarily result in the proximity determining mechanism determining that the remote unit is outside a predetermined proximity of the base unit.

It can be appreciated that the embodiments of the invention described herein have various advantages. The use of such apparatus can be seamless to the user. Apart from activating ON/OFF user control 31 to turn the system on, the user is not be required to do any interactions with the system. The base unit attached to the valuable may be turned off via the remote unit, so as to avoid any tampering on the valuable itself, in attempts to shut the system off. The alarm can go off automatically on the valuable if a predetermined timer expires after notifying the user and no interaction is received such as in cases where the owner is very far away. Furthermore the apparatus allows the user to leave his valuable behind without concerning himself with the retrieval of proprietary data from the device by others. The system disables the valuable's functionalities upon a theft attempt.

When the owner is near the valuable (a predetermined distance), he is free to move the valuable as much as he likes without hassle or nuisance from the device. He is also able to access any information housed within the valuable. Once the owner is separated from the valuable the system becomes armed, the peripherals are locked and inaccessible, and the motion detector monitors any motion on the protected valuable. Once motion is detected, the base sends a signal to the remote unit that causes a subtle visual and audible notification to the owner. Through a program running on the valuable, the base directs the commencement of encrypting the data stores with the valuable. At this point the owner is able to screen for false alarms, thereby disabling the alarm before it goes off on the base. However, if the owner is too far away and the remote unit does not receive the signal from the base or the owner does not disable the alarm, within a predetermined timeout period, the alarm on the base unit is engaged. Once the owner returns to the proximity of the valuable, if the alarm has not been triggered on the base unit, the system automatically disarms, decrypts the data, and unlocks the peripherals.

The proximity aspect of the device's periodic signaling allows the system to assess whether the owner is nearby or the owner is far away. This feature allows the system to provide security all the time, without relying on the owner to arm the system.

A soft switch mechanism for turning the apparatus off permits the base unit to be shut off only by the corresponding remote unit. The system combines hardware and software into the design so that only the unique signal from the OFF button on the remote combined with the unique digital signature of the remote is able to cut off power to the base. However, the base unit can be turned on easily via a normal switch located on the base unit, and the remote can be turned on via a normal switch located on the remote unit.

Certain implementations of the invention comprise computer processors which execute software instructions which cause the processors to perform a method of the invention. For example, one or more processors in a theft-protection system for valuables may implement the processes of one or more of FIGS. 2, 3, or 5–7 by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example, some alterations may include integrating the base unit 21 into the valuable being protected, for example as part of a motherboard to be inserted within a laptop. In addition to sounding an alarm upon a possible theft attempt, the base unit 21 could be set to activate or protect the valuable further by locking down the peripherals of a laptop, encrypting data, or even connecting to a global positioning system in order to track the valuable. Other substitutions of hardware for software and/or hardware or of software and hardware for hardware and/or software may be made. Other changes and modifications can be made without departing from the invention. Accordingly, the scope of the invention is to be construed in accordance with the substance defined by the following claims.

What is claimed is:

1. A security apparatus for protecting a valuable, the security apparatus comprising:

a portable remote unit comprising:
  a first transceiver capable of transmitting and receiving data signals,
  a notification device coupled to said first transceiver, the notification device being capable of activation in response to an alert signal received by said first transceiver, and,
  a deactivation element coupled to said first transceiver, the deactivation element configured to cause said first transceiver to transmit a DISARM signal representative of a command to deactivate an alarm; and,
a base unit configured for coupling to the valuable, the base unit comprising:
  a second transceiver capable of transmitting and receiving data signals,
  a proximity determining mechanism coupled to said second transceiver, the proximity determining mechanism configured to detect a proximity of the remote unit to the base unit, and,
  a data connection to the valuable,
  said base unit configured to send a signal to the valuable by way of the data connection, the signal indicating that the valuable should be disabled when the proximity determining mechanism determines that the remote unit is not within a predetermined proximity of the base unit.

2. A security apparatus according to claim 1 wherein the base unit is configured to send to the valuable by way of the data connection a signal indicating that the valuable should be enabled when the proximity determining mechanism determines that the remote unit is within the predetermined proximity of the base unit.

3. A security apparatus according to claim 1 wherein the base unit comprises a motion detector configured to generate a movement signal in response to a detected movement; and,
  the base unit is configured to send an encryption signal to the valuable by way of the data connection if the movement signal occurs when the proximity of the remote unit exceeds the predetermined threshold, the encryption signal triggering encryption of data on the valuable.

4. A security apparatus according to claim 3 wherein the base unit is configured to send a decryption signal to the valuable by way of the data connection in response to receipt of the DISARM signal at the second transceiver, the decryption signal triggering decryption of data on the valuable.

5. A security apparatus according to claim 3 wherein the base unit is configured to cause the second transceiver to transmit the alert signal to the remote unit if the movement signal occurs when the proximity of the remote unit exceeds the predetermined threshold.

6. A security apparatus according to claim 1 wherein:
  the base unit comprises a motion detector configured to generate a movement signal in response to a detected movement; and,
  the base unit is configured to cause the second transceiver to transmit the alert signal to the remote unit if the movement signal occurs when the proximity of the remote unit exceeds the predetermined threshold.

7. A security apparatus according to claim 5 wherein:
  the base unit is configured to suppress sending the alert signal to the remote unit if the movement signal occurs when the proximity of the remote unit is within the predetermined threshold.

8. A security apparatus according to claim 1 wherein the base unit comprises an alarm and a timer configured to track an elapsed time commencing at a transmission of the alert signal and terminating upon receipt by the second transceiver of the DISARM signal;
  wherein the base unit is configured to operate the alarm upon the timer reaching a predetermined level.

9. A security apparatus according to claim 1 comprising a valuable comprising a data processor and software, the software, when executed by the data processor causing the data processor to execute a process, the process comprising a step of determining whether or not the base unit is connected to the valuable by way of the data connection and, in response to determining that the base unit is not connected to the valuable by way of the data connection, automatically disabling a peripheral of the valuable.

10. A security apparatus according to claim 9 wherein the process comprises triggering encryption of data accessible to the data processor.

11. A security apparatus according to claim 1, wherein the base unit comprises a connector for detachably locking the base unit to the valuable.

12. A security apparatus according to claim 11 wherein the connector comprises a flexible cable.

13. A security apparatus according to claim 1 wherein the proximity determining mechanism comprises a mechanism configured to cause the second transceiver to transmit an encoded signal and to subsequently detect a reply encoded signal from the remote unit.

14. A security apparatus according to claim 1 wherein the proximity determining mechanism comprises a mechanism for measuring a strength of a signal transmitted by the first transceiver of the remote unit and received at the second transceiver of the base unit.

15. A security apparatus according to claim 1 wherein the proximity determining mechanism comprises an ultrasonic receiver configured to monitor a strength of an ultrasonic signal emitted by an ultrasonic transmitter on the remote unit.

16. A security apparatus according to claim 1, wherein the base unit comprises a power switch and a mechanism for operating the power switch to turn off the base unit in response to an OFF signal received at the second transceiver.

17. A security apparatus according to claim 1, wherein the data connection to the valuable comprises a USB interface.

18. A security apparatus according to claim 1 wherein the data connection to the valuable comprises a connector that plugs into a card slot on the valuable.

19. A security apparatus according to claim 1, wherein the base unit comprises a decoder element coupled to decode signals detected by the second transceiver and to discard signals not encoded in a manner corresponding to the remote unit.

20. A security apparatus according to claim 1, wherein the remote unit includes a system identifier for generating a system identification signal representative of a remote unit and at least one base unit.

21. A security apparatus according to claim 20, comprising a unit identifier for generating unit identifier codes capable of discriminating among a plurality of base units having a common system identification signal.

22. A security apparatus according to claim 1 wherein the base unit is built into the valuable.

23. A security apparatus according to claim 1 wherein the base unit is detachably locked to the valuable.

24. A base unit for use in securing a valuable article, the base unit comprising:
  a wireless transceiver capable of transmitting and receiving data signals, a proximity determining mechanism configured to detect a proximity of a remote unit to the base unit, and, a data connection to the valuable article, the base unit configured to send a signal to the valuable by way of the data connection, the signal indicating that the valuable should be disabled when the proximity determining mechanism determines that the remote unit is not within a predetermined proximity of the base unit.

25. A method for securing a valuable, the method comprising coupling a base unit to the valuable;

detecting whether a remote unit is within a predetermined range of the base unit;

if the remote unit is not within the predetermined range of the base unit, executing a locking process comprising: sending a lock signal to lock the valuable; and, if the remote unit is within the predetermined range of the base unit, executing an unlocking process comprising: sending an unlock signal to unlock the valuable.

26. A method according to claim 25, wherein executing the locking process comprises:

determining whether the valuable has been disturbed and, if the valuable has been disturbed triggering encryption of data on the valuable.

27. A method according to claim 26 wherein the locking process comprises:

transmitting an alert signal by way of a wireless transmitter;

measuring a time elapsed time from the transmission of the alert signal; and, triggering an alarm upon the elapsed time reaching a predetermined value.

28. A method according to claim 27 comprising disabling the alarm upon receipt of a DISARM signal.

29. A method according to claim 28 comprising triggering decryption of the data on the valuable upon receipt of the DISARM signal.

30. A method according to claim 25 comprising detecting whether internal batteries within the remote unit have reached a predetermined low-power threshold; and, if so, transmitting a low-power signal from the remote unit to the base unit.

31. A method according to claim 25, wherein detecting whether the remote unit is within the predetermined range of the base unit comprises monitoring a strength of an RF signal transmitted by the remote unit and received at the base unit.

32. A method according to claim 25, wherein detecting whether the remote unit is within the predetermined range of the base unit comprises sending a signal from the base unit to the remote unit and receiving at the base unit a reply signal from the remote unit.

33. A method according to claim 25, wherein detecting whether the remote unit is within the predetermined range of the base unit comprises detecting an ultrasonic signal.

* * * * *